Jan. 6, 1953     W. W. COFFEEN     2,624,709
CERAMIC BODIES
Filed Dec. 15, 1951     2 SHEETS—SHEET 1
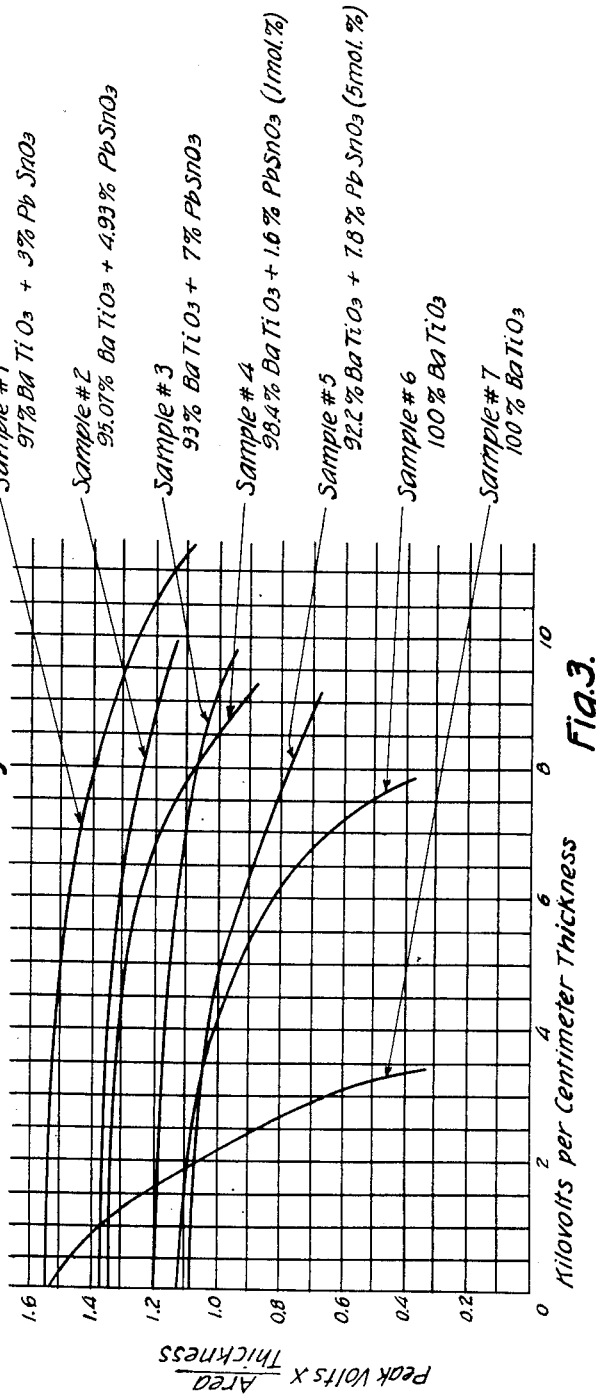
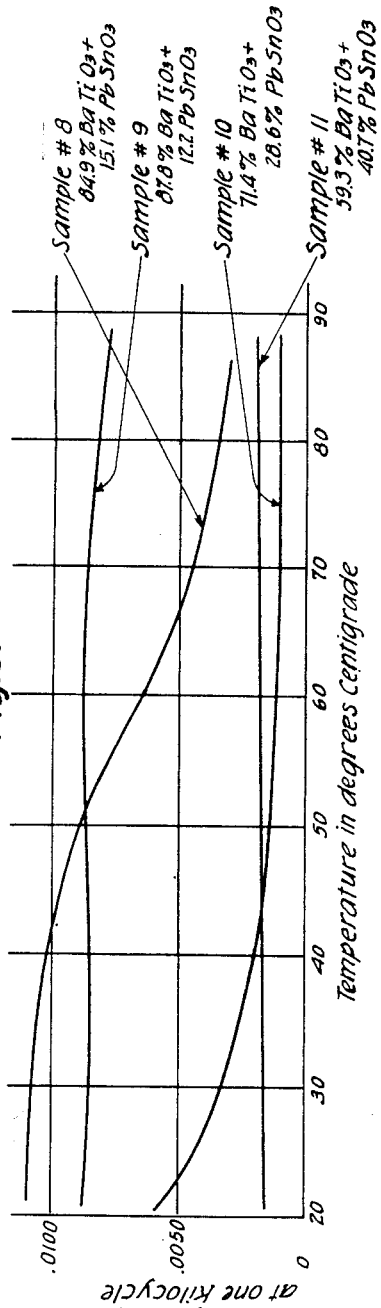
INVENTOR.
William W. Coffeen
BY
Moses, Nolte, Crews & Berry
ATTORNEYS

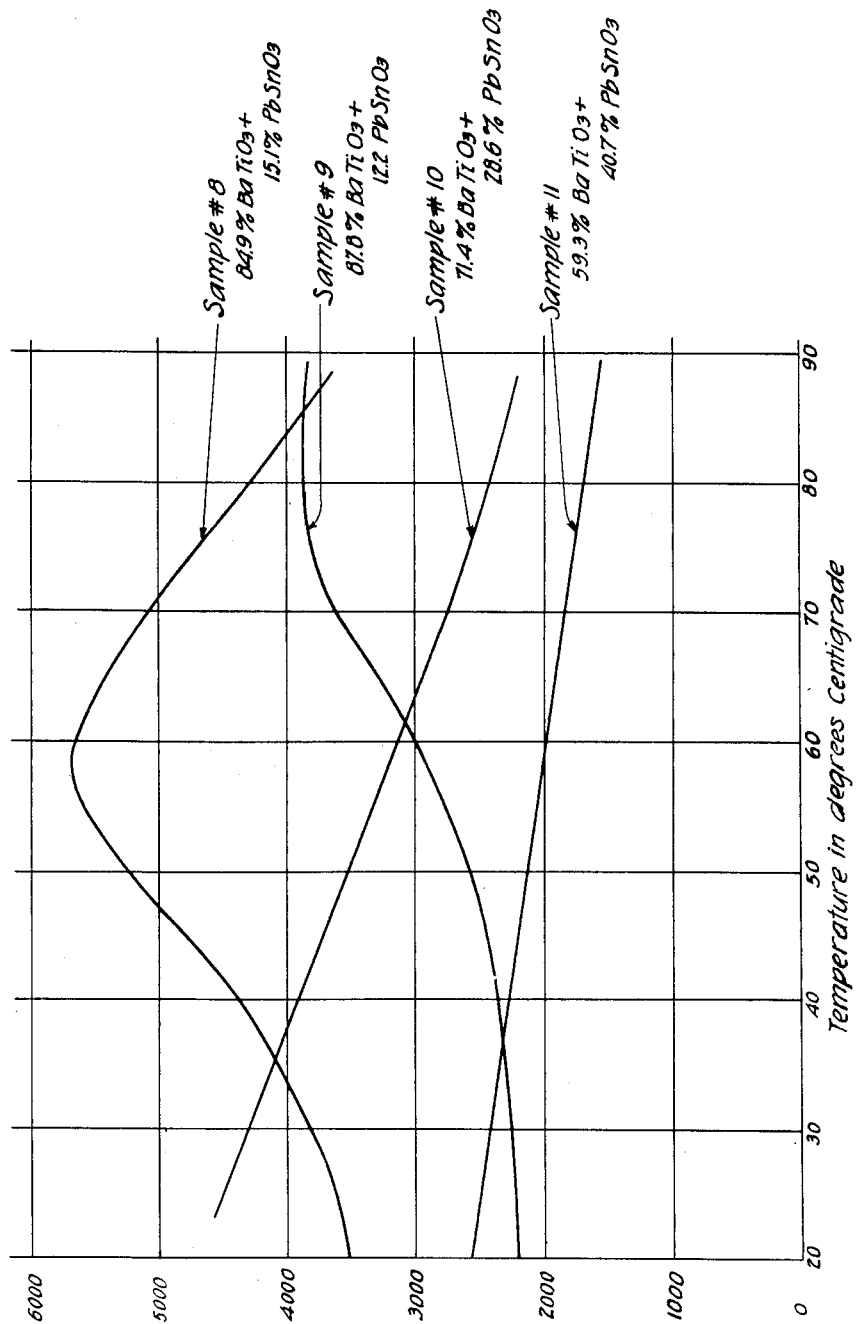

Patented Jan. 6, 1953

2,624,709

UNITED STATES PATENT OFFICE 2,624,709

CERAMIC BODIES

William W. Coffeen, Union, N. J., assignor to Metal & Thermit Corporation, New York, N. Y., a corporation of New Jersey Application December 15, 1951, Serial No. 261,890

5 Claims. (Cl. 252—62.9)

This invention relates to ceramic materials. The invention disclosed and claimed in the present application comprises a combination of barium titanate and lead stannate. The use of barium titanate either alone or in combination with other titanates is well known. Such materials are useful both for their piezoelectric properties and for their dielectric properties.

One reason why these titanate ceramics are considered of value as capacitor dielectrics is the fact that they have high dielectric constants. Such property makes the materials effective substitutes for paper and mica condensers in filter and by-pass circuits. Many other uses are also available. The materials are also considered valuable as capacitor dielectrics because bodies having relatively low power factors may be produced.

For piezo-electric purposes it is desirable that the material be susceptible to permanent polarization and that it be capable of employment to produce a high power output without deterioration due to loss of polarization. Piezoelectric bodies of barium titanate have been found useful except where large power outputs have been required. An addition of 4% lead titanate has been found to improve the performance, but the resulting composition has been found subject to considerable variation, presumably because of a tendency toward volatilization.

I have found that if lead stannate be employed with barium titanate, and the bodies be properly fired, a considerable improvement will be produced in stability under conditions of large power output, even over that previously realized with the composition including lead titanate.

I have also found that less variation is encountered from lot to lot in the finished product. The addition of the lead stannate reduces the firing temperature of the material even when added in small quantities, and this is desirable.

Other objects and advantages will hereinafter appear.

In the drawing forming part of this specification,

Fig. 1 is a graphical showing of the results of certain tests made of piezo-electric samples; and Figures 2 and 3 show the results of tests of certain capacitor dielectric samples.

For purposes of illustration, and in no sense by way of limitation, the following process is described as one which has been successfully employed to produce a ceramic piece suitable for piezo-electric use.

To forty grams of barium titanate, 2.2 grams of lead stannate were added, together with one hundred cubic centimeters of water, and thoroughly mixed by blunging. After drying by evaporation and pulverizing, the powder was moistened in a mortar with two cubic centimeters of a two and one-half percent starch solution and pressed into a single cylinder one and one-quarter inches in diameter, dried, and calcined for one hour at 1600° F. After calcination, the material was ground to pass a 325-mesh screen, again moistened with two cubic centimeters of starch solution as before, and small discs three-eighths of an inch in diameter and about one hundred mils thick were pressed at about twenty thousand pounds per square inch. These discs were dried and fired on platinum foil in an electric furnace for one hour at 2200° F. The discs were found to be nonporous, having zero absorption upon boiling in carbon tetrachloride.

Silver contacts were fired on the two flat faces of one of the discs and it was then polarized under direct current for a 24-hour period. The disc was then shorted to remove remanent charge.

For purposes of comparison a disc composed of barium titanate alone was prepared according to the same process, except that the firing was done at 2500° F.

Following poling and shorting, the specimens were checked for piezo-electric output under increasing increments of intermittently applied D. C. bias voltage, opposite in polarity to the original poling. Output was measured by determining the peak output voltage under controlled stress from a piezo-electric vibrator. Under these conditions at three kilovolts per centimeter bias voltage, the output of the disc containing lead stannate decreased less than one percent, while the output of the disc composed of barium titanate alone decreased sixty percent. At six kilovolts per centimeter thickness the barium titanate disc output had dropped to zero, while that of the disc containing lead stannate had decreased less than three percent.

In Figure 1 results of tests to which certain samples were subjected are graphically set forth. The ordinates represent the product of peak voltage by the ratio of area to thickness, and the abscissas represent D. C. bias voltage gradient in kilovolts per centimeter thickness.

It will be noted that the two curves of sharpest slope cover samples which were composed of barium titanate alone. The two curves of next greatest slope cover samples which contained 7.8% lead stannate and 1.6% lead stannate. The remaining curves, which exhibit the most desirable characteristics, cover samples containing between 3% and 7% lead stannate.

From the results shown by Figure 1, and from the results of many other tests similar in character but covering a wider range of proportions of barium titanate and lead stannate, it has been determined that combinations of barium titanate and lead stannate ranging from ½% to 20% of lead stannate by weight are useful for piezo-electric purposes, but that the optimum range includes compositions in which the percentage by weight of lead stannate lies between 2 and 8%.

For application as capacitor dielectrics, combinations of barium titanate and lead stannate also produce extraordinarily fine results, but the operative and optimum ranges are not the same as for piezo-electric purposes.

For capacitor applications, it is desirable that the dielectric constant be high and that the power factor be low. It is also desirable that these properties shall be comparatively stable under variations of temperature. Tests have been made of many compositions made up of barium titanate and lead stannate ranging from 1.6% by weight of lead stannate to 65% by weight of lead stannate. As a result of these studies it has been determined that compositions containing from 5% to 65% lead stannate by weight are useful as dielectrics in capacitors, but that compositions containing from 15% to 40% by weight of lead stannate are to be preferred.

The results of tests of samples substantially within the preferred range are graphically set forth in Figures 2 and 3. The compositions of the samples used in these tests are indicated in Figure 2.

For these tests, samples were made in the same manner as described above except that the specimens were not poled. Copper leads were soldered directly to the silver contacts and after an aging period of at least one week, the dielectric constant and power factor at a frequency of 1 kc. was determined for the temperature range from 25° C. to 85° C. which covered the operating range of most commercial capacitors. The specimens were immersed in a good insulating oil and electrical measurements made using a conventional bridge circuit balanced by an amplifier and null detector.

In Figure 2 it will be observed that the several samples all had high dielectric constants throughout the temperature range tested, the values at 20° C. lying between 2200 and 4600 and at 85° C. lying between 1600 and 4000. In no instance did the deviation from maximum value for a given specimen exceed 53%. In some instances the maximum deviation was far under that figure. In the cases of samples #10 and #11 the relationship of dielectric constant to temperature was a nearly linear one.

In Figure 3 it will be noted that the power factor in each instance stood at or below 1.2% throughout. In the case of sample #11 the power factor is confined between the limits .15 and .20% throughout the temperature range covered by the test.

The samples involved in the foregoing tests were made in the manner already described for the piezo-electric bodies up through the point of firing, save that the proportioning of the ingredients was chosen as indicated above, and the firing temperature was adjusted downward as the proportion of lead stannate was increased. The discs were then silvered in the usual manner to form capacitors for testing.

I have described what I believe to be the best embodiments of my invention. I do not wish, however, to be confined to the embodiments described, but what I desire to cover by Letters Patent is set forth in the appended claims.

I claim:

1. A range of ceramic compositions substantially comprising by weight a combination of 99½% to 35% of barium titanate and ½% to 65% of lead stannate.

2. A dense dielectric body substantially comprising by weight 95% to 35% of barium titanate and 5% to 65% of lead stannate.

3. A dense dielectric body substantially comprising by weight 85 to 60% of barium titanate and 15% to 40% of lead stannate.

4. A dense ceramic body consisting substantially by weight of a combination of 99½% to 80% of barium titanate and ½% to 20% of lead stannate.

5. A dense ceramic body consisting substantially by weight of a combination of 98% to 92% of barium titanate and 2% to 8% of lead stannate.

WILLIAM W. COFFEEN.

No references cited.